INVENTOR
NORMAN A. NELSON
BY *James Jackson*
ATTORNEY

INVENTOR
NORMAN A. NELSON

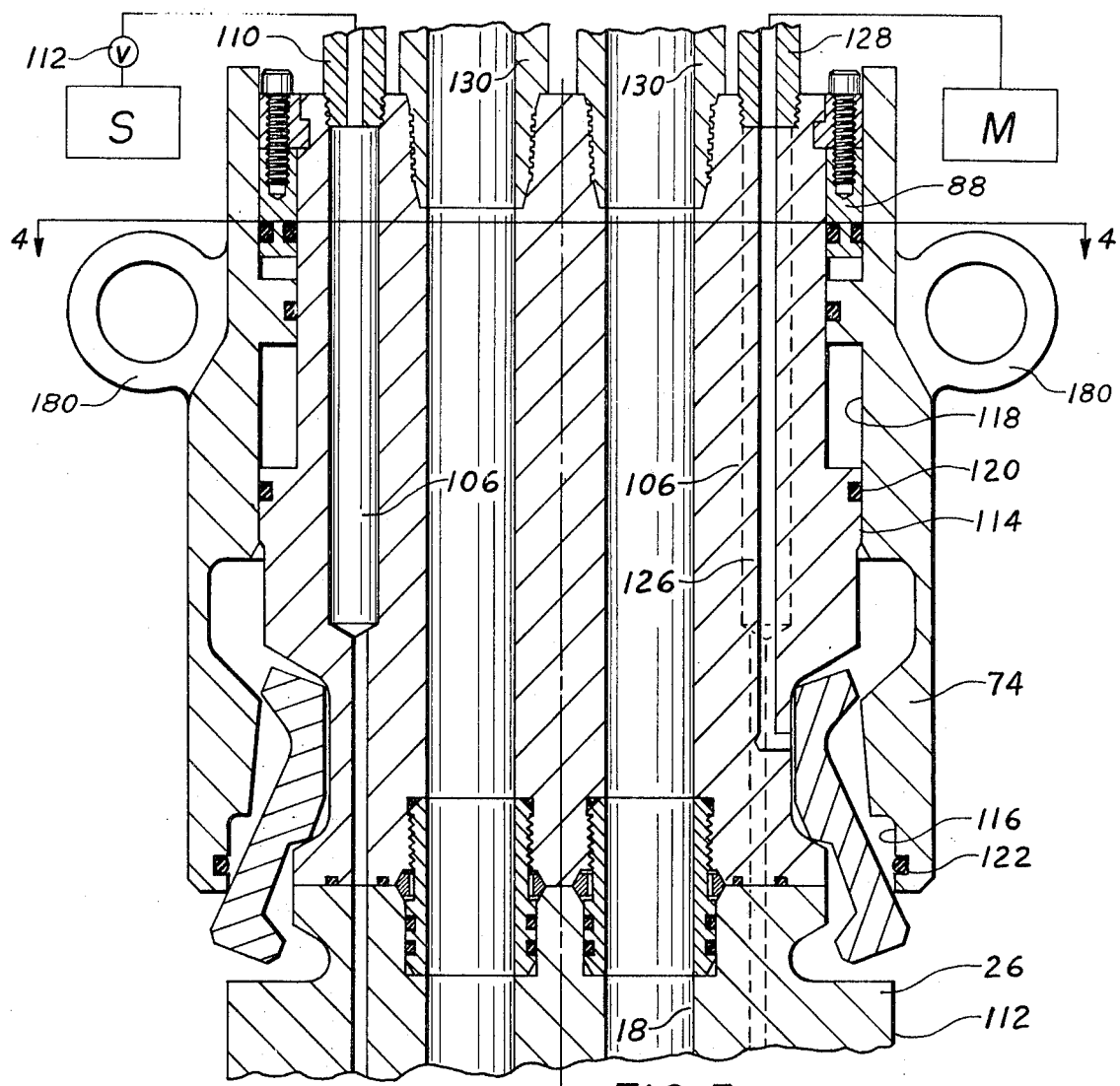
FIG. 3
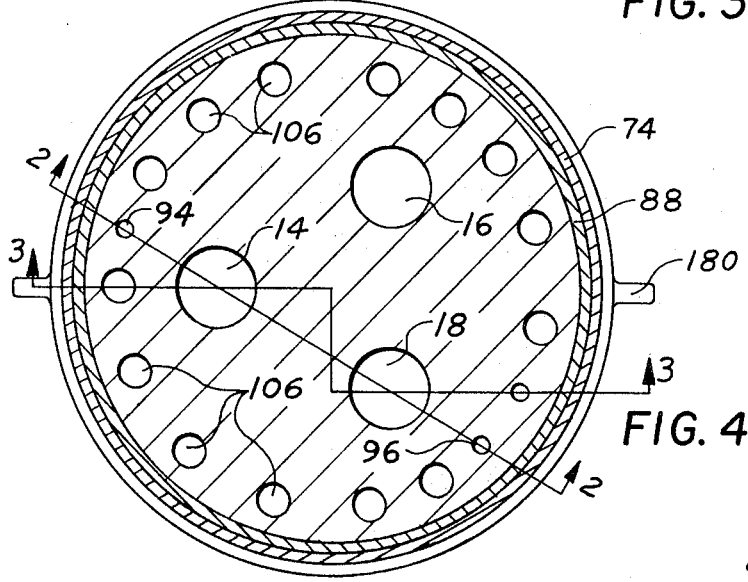
FIG. 4
INVENTOR
NORMAN A. NELSON
ATTORNEY

# United States Patent Office 3,523,579
Patented Aug. 11, 1970

3,523,579
SUBSEA WELLHEAD VALVE SYSTEM AND COLLET CONNECTOR MECHANISM THEREFOR
Norman A. Nelson, Houston, Tex., assignor to ACF Industries, Incorporated, New York, N.Y., a corporation of New Jersey
Filed Nov. 15, 1968, Ser. No. 776,079
Int. Cl. E21b 43/01
U.S. Cl. 166—.6                                9 Claims

ABSTRACT OF THE DISCLOSURE

A wellhead valve assembly, which includes a plurality of hydraulically actuated valves and an appropriate hydraulic fluid supply system for actuation of the valves. A hydraulically actuated collet connector is provided for connecting production flow conduits and hydraulic fluid supply conduits to the wellhead valve assembly. The collet connector includes means for remotely detecting leakage of production fluid or hydraulic fluid in the event the joint between the wellhead valve body and the hydraulic collet connector should fail to properly seal or should subsequently develop leakage.

BACKGROUND OF THE INVENTION

This invention relates generally to wellhead systems and more particularly to subsea wellhead valve assemblies, including hydraulic actuators which may be remotely controlled to induce selective controlling movement to the valves of a remotely located wellhead. While the discussion hereinbelow is generally related to subsea wellhead systems, it is not intended that this invention be limited to wellhead systems which are positioned on the ocean floor. It will be clearly apparent that this invention may be utilized in most types of wellhead installation.

Technology advances related to subsea petroleum exploration have resulted in the development of various conduit and wellhead connector mechanisms which may be remotely controlled for the purpose of achieving connection between mechanical and hydraulic apparatus of wellheads, conduits, and the like. A popular type of connector assembly is a hydraulically actuated collet connector which utilizes a series of segment clamps which are biased by various other mechanical apparatus to releasably secure a pair of abutting flanges into sealed assembly. Collet connectors and other acceptable connector mechanisms are generally utilized for connection of the wellhead valve system or the production system of the wellhead to lower wellhead structure so that the wellhead valve assembly may be disconnected and removed in the event that replacement or repair is necessary.

Subsea wellhead structures are provided with one or more flow conduits which are adapted to conduct produced fluid such as petroleum or natural gas from the well to a remotely located storage and handling facility. Such flow conduits are generally constructed integrally with the wellhead body or are permanently attached to the wellhead body prior to installation thereof. It has not heretofore been considered practical to utilize a single connector for connection of production flow conduits and hydraulic fluid supply conduits to the upper extremity of a wellhead. It is ordinarily necessary to maintain the flow conduits in permanent connection with the wellhead system even though the wellhead system may be subject to damage due to strain which might be applied to the flow conduits by wave action caused by storms or the like. It has been considered desirable to provide connection structure which is actuatable to achieve quick disconnection of the production flow conduits and hydraulic fluid or electrical current supply conduits so that subsea wellheads may be protected from damage which, for example, might be caused by excessive movement of surface structure induced by rough seas. Connection structure has not, heretofore, been available which will achieve quick disconnection of the flow conduits structure and at the same time leave the wellhead in a safe and protected condition.

Although remotely actuatable connection devices of the general nature contemplated herewith are utilized there has not been provided a reliable means or method of detecting fluid leakage from joints which are remotely made up. Nor, has there been provided apparatus for detecting leakage which might occur subsequent to proper sealed assembly of the joined connection flanges. Such leakage might be developed by slight shifting of parts of the connection or might occur if sealing devices are damaged or worn subsequent to proper assembly thereof.

Accordingly, it is a primary object of this invention to provide a novel subsea wellhead valve assembly utilizing a connector mechanism which is capable of quickly disassembling the production flow conduit structure and the hydraulic fluid supply conduit structure from the wellhead valve assembly.

A further object of this invention is to provide a novel wellhead valve assembly including a hydraulically actuated collet connector structure which enables quick and simultaneous assembly or disassembly of the flow conduit structure and the hydraulic fluid supply structure of the wellhead valve assembly.

Among the several objects of this invention is contemplated the provision of a novel wellhead valve assembly including a collet connection structure which is capable of detecting fluid leaked from the collet connection joint and actuating remotely located signal apparatus responsive thereto.

It is a further object of this invention to provide a novel wellhead valve assembly including remotely actuatable connector structure which is capable of being manually actuated to achieve disconnection in the event of failure of the hydraulic power supply system which controls the same.

It is an even further object of this invention to provide a novel wellhead valve assembly including a collet connector structure which is simple in construction, reliable in use, and low in cost.

Other and further objects, advantages, and features of this invention will become apparent to one skilled in the art upon consideration of the written specification, the attached claims, and the annexed drawings. The form of the invention, which will now be described in detail, illustrates the general principles of the invention, but it is to be understood that this detailed description is not to be taken as limiting, since the scope of the invention is best defined by the appended claims. Such description will be referred to by reference characters in the drawings in which:

FIG. 3 is a fragmentary sectional view of the wellhead valve assembly of FIG. 1 taken along line 3—3 in FIG. 4 and illustrating the collet connection structure thereof in its unlocked position.

FIG. 4 is a sectional view of the collet connector structure taken along lines 4—4 in FIG. 3.

Briefly, the instant invention concerns a wellhead valve assembly having at least one and preferably a plurality of fluid flow passages extending therethrough. One or more valves are provided for controlling the flow of fluid through each of the production flow passages. The wellhead valve assembly is provided with a hydraulic fluid supply system which is capable of conducting hydraulic fluid to a selected one of the wellhead valve operators for selective actuation thereof. The wellhead valve assembly is provided with a hydraulically actuated collet connector structure which includes a connector body provided with flow passages for registry with the production flow passages of the wellhead body and which also includes hydraulic fluid supply passages for conducting hydraulic fluid through the connector body. The collet connector structure includes a plurality of segments and clamp members which are movable by a shroud member surrounding the connector body to achieve releasable connection of the connector body to the upper flange of the wellhead valve assembly. Fluid communication for the production flow passages and the hydraulic fluid supply passages is accomplished through the sealed connection between the wellhead body and the collet connector. The collet connector structure is also provided with a fluid passage establishing fluid communication between a leakage protection chamber surrounding the abutting sealed flanges and remotely leakage detector apparatus for the purposes of detecting any leakage from the joint between the wellhead valve body and the collet connector body.

Figure 1:
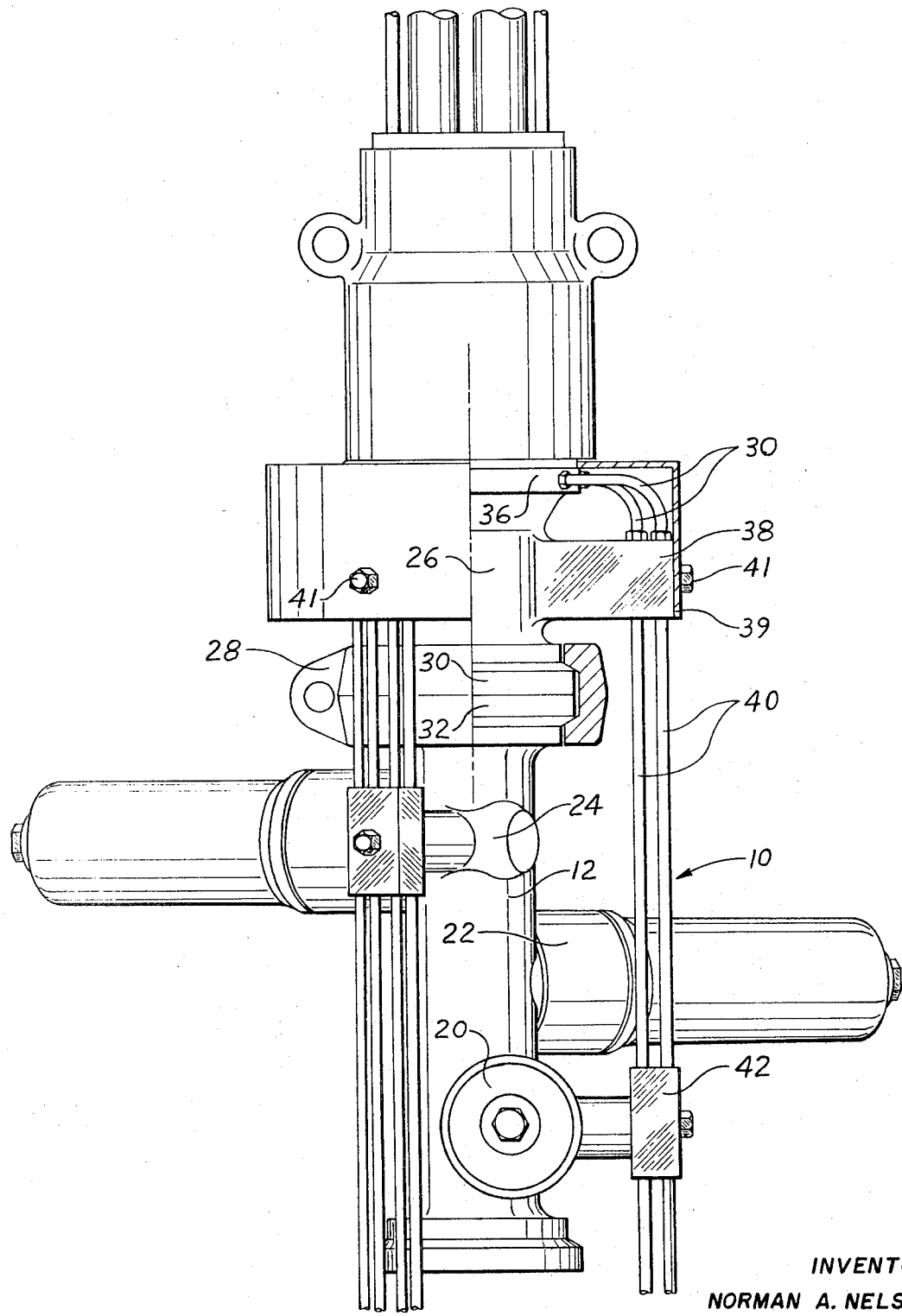
FIG. 1 is an elevational view of the uppermost section of a wellhead valve assembly having portions thereof broken away and illustrated in section.

Referring now to the drawings for a more detailed description of this invention, in FIG. 1 is shown the top section of a wellhead valve assembly 10 which comprises a wellhead valve body 12 having three flow passages 14, 16, and 18, best seen in FIGS. 3 and 4. The wellhead valve body 12 is provided with valves 20, 22, and 24, each being associated with one of the flow passages 14, 16, and 18, to control the flow of production fluid produced through the wellhead. Each of the valves is provided with a valve operator mechanism which is hydraulically actuated to induce controlling movement to the valve with which it is associated.

Figure 2:
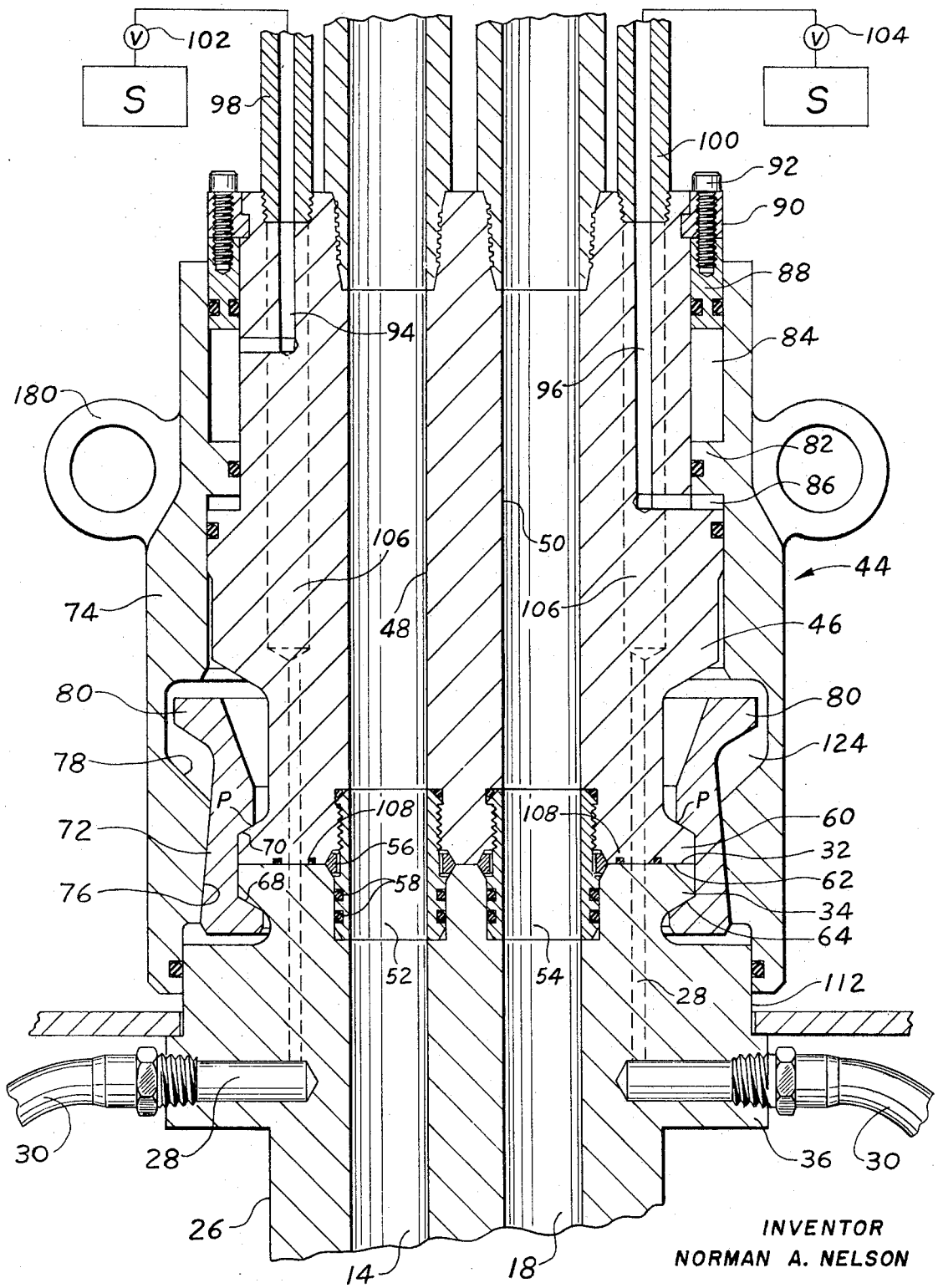
FIG. 2 is a fragmentary sectional view of the wellhead valve assembly of FIG. 1 taken along line 2—2 in FIG. 4 and illustrating the collet connector structure thereof, in detail.

A hydraulic fluid connector spool assembly 26 is disposed at the upper extremity of the wellhead body 12 and is connected to the wellhead body by a clamp member 28 which retains a lower flange 30 of the connector spool 26 and an upper flange 32 of the wellhead body 12 in intimate sealed abutting engagement. As best seen in FIG. 2, the hydraulic fluid adapter spool 26 is provided with a plurality of flow passages which are disposed in registry with and provided extensions of the flow passages 14, 16, and 18 in the valve body. A plurality of hydraulic distribution passages 29 are formed by intersecting drilled bores within the adapter spool 26 to provide for a transfer of hydraulic fluid to a plurality of hydraulic fluid supply conduits 31 which are threadedly connected or otherwise fixed to the adapter spool 26. Portions of the passages 29 are shown in dash lines to facilitate better understanding of the conduit and passage structure in the collet connector. The drilled hydraulic fluid distribution passages terminate at a planar surface 33 defined by an upper connection flange 34 of the adapter spool 26. The hydraulic fluid distribution conduits 31 extend from an upper flange portion 36 of the adapter spool to bosses 38 which are formed integrally with or connected to the spool 26. A plurality of hydraulic fluid distribution conduits 40 are disposed in sealed fluid communication with distribution passages formed within the bosses 38 and serve to transmit hydraulic fluid to selective ones of the valve and valve operator assemblies of the wellhead.

Utilization of a hydraulic fluid adapter spool, such as that illustrated at 26, effectively allows a wide range of wellhead adaptation even though the basic structure of the wellhead valve body remains unchanged. Standard wellhead valve assemblies may be employed without involving excessive modification thereof. It is within the spirit and scope of this invention, however, to provide hydraulic fluid supply conduit structure which is manufactured within the wellhead valve body and which is connected to the hydraulic fluid distribution system of the wellhead valve assembly in such manner as to eliminate the necessity for a hydraulic fluid adapter spool such as that shown at 26 in FIG. 1. The adapter structure, therefore, is not intended to limit the scope of this invention.

A protective cover 39 is fixed to the spool 26 about the hydraulic fluid supply conduits 31 by bolts 41 which are threadedly received within the bosses 38 of the spool. The protective cover prevents damage to the conduits 31 by the collet connector device as the collet connector is lowered into assembly with the spool 26.

Hydraulic fluid from the fluid distribution conduits 40 will be transmitted through modular connectors 42 which communicate a selected one of the fluid distribution conduits to the hydraulic circuitry of one of the valve operators. The other fluid distribution conduits will extend downwardly into fluid communication with other selected operators. Various other conventional means may be utilized to establish fluid communication between the hydraulic fluid distribution conduits and the various selected valve operators without departing from the spirit or scope of this invention.

In order to establish fluid communication between the subsea wellhead and a remotely located storage and control facility, a hydraulically actuated collet connector is provided as illustrated generally at 24. The collet connector 44 includes a collet body 46 which is provided with a plurality of flow passages adapted to be disposed in registry with the production flow passages 14, 16, and 18 of the wellhead valve body. Two of these passages 48 and 50 are illustrated in FIGS. 2 and 3. Joint connectors, such as those illustrated at 52 and 54 in FIGS. 2 and 3, are threadedly received within enlarged threaded portions of the passages 48 and 50 in the collet body 46 and slidingly are received in sealed engagement within enlarged cylindrical portions of corresponding flow passages in the adapter spool 26. Metallic joint seals 56 are disposed about the joint connectors in such manner that the joint seals 56 will be withdrawn along with the joint connectors as the collet body 46 is separated from the adapter spool 26. A plurality of O-ring type resilient sealing members 58 are received withiin annular grooves formed about the joint connectors and serve to establish a fluid-tight seal between the joint connectors and the cylindrical walls defined by the enlarged portions of the flow passages.

For physical releasable assembly of the collet connector 44 to the uppermost portion of the wellhead structure, an annular connector flange 60 is formed at the lowermost portion of the collet body 46 and is provided with a planar surface 62 which is adapted for abutting sealed engagement with a planar surface 32 formed on the adapter spool 26. The flanges 34 and 60 are provided with inclined cam surfaces 64 and 66 respectively, which are engaged by diverging cam surfaces 68 and 70 formed on each of the segment clamps 72. A sleeve-like shroud member 74 surrounds the collet body 46 and is provided with an internal locking cam surface 76 and an internal unlocking cam surface 78 which are adapted to engage portions of the segment clamps 72 for manipulation thereof. As the shroud member 74 moves downwardly relative to the collet body, the diverging locking cam surface 76 engages the segment clamps 72 and forces the cam surfaces 68 and 70 of the segment clamps into tight engagement with the cam surfaces 64 and 66 of the connection flanges. This movement causes the flanges 34 and 60 to be drawn into tight sealed engagement. As the shroud member 74 moves upwardly with respect to the collect body 46, unlocking cam surface 78 engages tail portions 80 of the segment clamps 72 thereby causing the segment clamps to be pivoted about pivot points P. This causes the cam surfaces 68 and 70 of the segment clamps to release the corresponding cam sufaces of the connection flanges. After this movement has taken place, the collet connector 34 may simply be withdrawn from its abutting assembly with the adapter spool 26.

The shroud member 74 is provide with an internal flange 82 which cooperates with a reduced diameter portion of the collet body 46 to define upper and lower hydraulic actuation chambers 84 and 86, respectively. The upper extremity of the upper hydraulic chamber 84 is defined by a cylindrical insert 88 which is retained in position about the collet body 46 by clamp members 90. Bolts 92 extend through the clamp members and threadedly engage the cylindrical insert 88 to retain the clamps 90 and the insert in assembly.

For supplying pressurized hydraulic fluid to the upper and lower hydraulic actuation chambers, hydraulic fluid supply passages 94 and 96 are formed in the collet body by intersecting drilled passages and are disposed in fluid communication with the upper and lower chambers 84 and 86 respectively. The passages 94 and 96 terminate in threaded apertures into which are threaded hydraulic fluid supply conduits 98 and 100. Each of the fluid supply conduits are communicated to a source S of hydraulic fluid under pressure which source is controlled by means of control valves 102 and 104 as shown schematically in FIG. 2. The valves 102 and 104 will ordinarily be solenoid actuated valves or some other such acceptable type of valve designed for quick opening and closing. The shroud member 74 is raised from the locked position thereof as illustrated in FIG. 2 to the unlocked position illustrated in FIG. 3 by controlling the control valve 104 to allow introduction of pressurized hydraulic fluid through the supply passage 96 and into the hydraulic actuation chamber 86.

To cause locking movement of the shroud member 74 from the FIG. 3 position to the FIG. 2 position thereof, the fluid control valve 102 is actuated to communicate hydraulic fluid pressure from the hydraulic fluid supply source S to the upper hydraulic actuation chamber 84 through the hydraulic supply passages 94. The force of the hydraulic fluid is exerted against the upper portion of the flange 82 and causes the shroud member to be forced downwardly relative to the collet body, resulting in camming of the segment clamp members 72 to the locking position thereof as illustrated in FIG. 2.

To provide for actuation of selected ones of the valve operator asemblies, a plurality of hydraulic fluid supply passages 106 are formed in the collet body 46. To facilitate better understanding of the hydraulic fluid supply structure, the passages 106 are illustrated in dash lines in FIG. 2 and illustrated in full line and dash lines in FIG. 3. The supply passages 106 terminate at the planar surface 62 in such manner as to be disposed in registry with the passages 29 of the adapter spool 26. Annular sealing members 108 are disposed within grooves formed in the collet body 46 about the passages 106 so that fluid-tight sealing engagement may be established between the collet body and adapter spool to prevent leakage of the hydraulic fluid from the joint established between flanges 34 and 60. Pressurized hydraulic fluid is communicated from a fluid supply source S to a plurality of conduits 110 received within threaded outer portions of the passages 106. As illustrated schematically in FIG. 3, control of hydraulic fluid supplied through the conduit 110 is established by means of control valve 112. A selected one of a plurality of control valves 112 is actuated in order to supply pressurized hydraulic fluid through a passage 106 to a selected one of the valve and valve operator mechanisms.

The hydraulic fluid adapter spool 26 and the collet body 46 are provided with cylindrical surfaces 112 and 114 respectively, which are slidably engaged by cylindrical surfaces 116 and 118 defined within the shroud 74. Annular sealing members 120 and 122 are received within annular grooves formed in the collet body and shroud respectively, and serve to establish fluid-tight seals between the collet body and the shroud and between the spool and the shroud after the shroud member 74 has been moved to the locked position thereof, as illustrated in FIG. 2. With the shroud member 74 in the locked or FIG. 2 position thereof, a sealed leakage detection chamber 124 is established about the joint between the flanges 34 and 60. The seals established between the shroud member 74 and the collet body and spool also effectively provide sealed protection for the segment clamps and the joint portion of the collet connector assembly by precluding entry of marine life or other foreign matter into the chamber 124. Moreover, as further protection of the clamp and joint area, the chamber 124 may be flushed with a preservative fluid merely by communicating preservative fluid through drilled passages in the collet body to the sealed leakage detection chamber 124.

For the purpose of detecting leakage from either the flow passages 14, 16, and 18, or from any one of the hydraulic fluid supply passages which might occur because of an improper seal between the resilient sealing members 108 and the planar surfaces 32 and 62 or as the result of a defective or worn seal, a leakage detection passage 126 is formed in the collet body 74 by intersecting drilled passages. The passage 126 is communicated at its lower extremity with the sealed leakage detection chamber 124 and terminates at a threaded aperture formed at the upper portion of the collet body. A leakage detection conduit 128 is threadedly received within the internally threaded portion of the leakage detection passage 126 and establishes fluid communication between the leakage detection chamber and a monitoring system M, illustrated schematically in FIG. 3. In the event one of the resilient sealing members or joint connection members should develop a leak or should fail to establish a fluid-tight seal, pressurized fluid leaked into the leakage detection chamber 124 will be transmitted through the passage 126 and conduit 128 to the monitoring system M. The monitoring system will automatically signal that leakage is occurring thereby indicating that repair of the system is in order. Repair of the collet connector system is achieved simply by hydraulically actuating the shroud member 74 to its unlocked or FIG. 3 position thereof and by raising the collet connector to the surface so that such repair can be effected.

A plurality of production flow conduits, such as those illustrated at 130 in FIGS. 2 and 3 are received within threaded apertures formed in the collet body 46. The production flow conduits 130 extend to a storage facility so that fluid produced through the wellhead may be received and stored or transported as desired.

Figure 5:
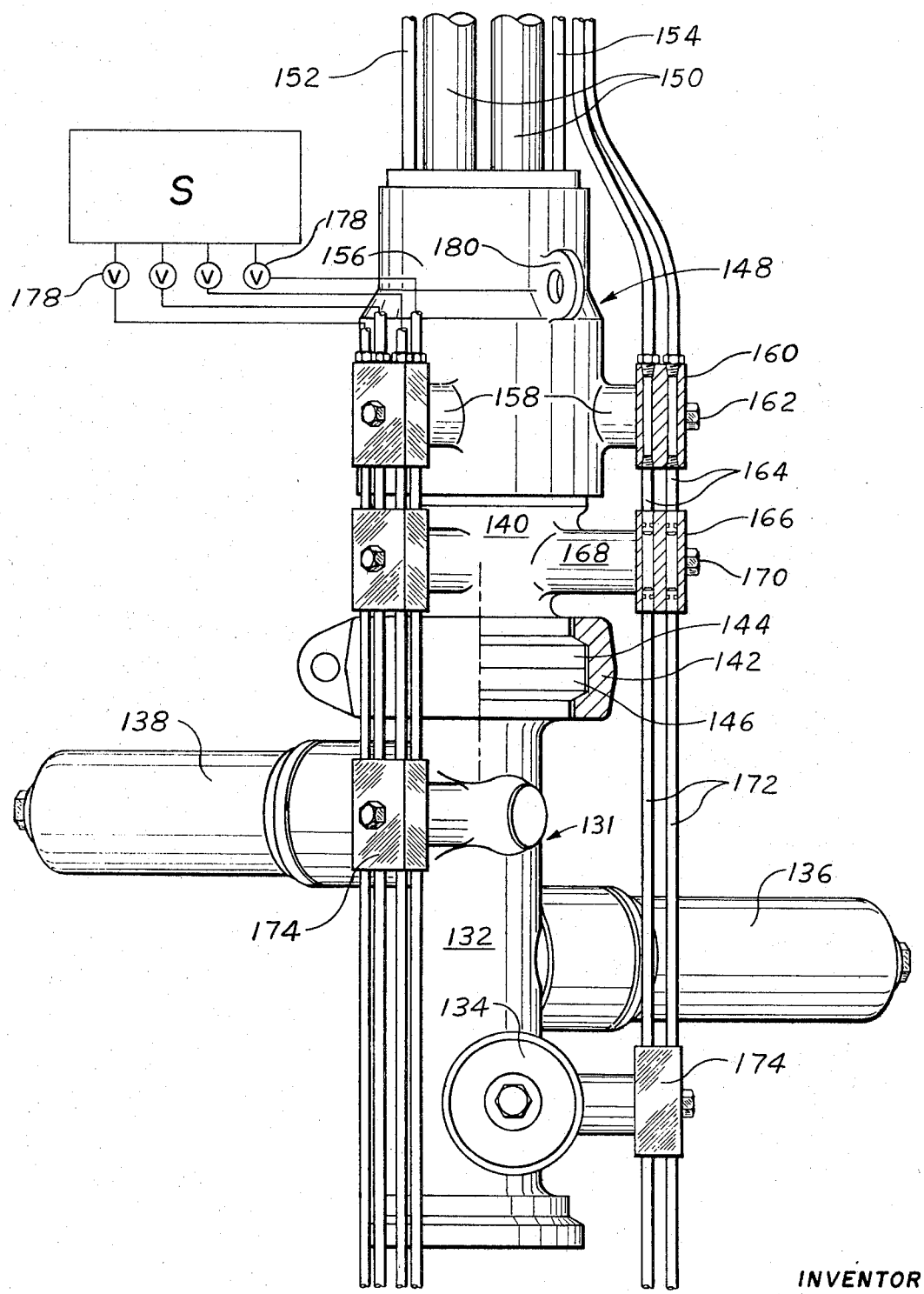
FIG. 5 is an elevational view of a modified subsea wellhead valve assembly, of this invention, utilizing a collet connector structure and an external bypassing hydraulic fluid supply system for the valve operators of the wellhead valve assembly.

With reference now to FIG. 5, a modified embodiment of this invention includes a wellhead valve assembly 131 having a section 132 provided with a plurality of production flow passages, not shown, and valve and valve operator assemblies 134, 136, and 138, which are constructed and function substantially identical to the valves and valve operator assemblies of the wellhead valve section 10 illustrated in FIG. 1. A connector spool 140 is fixed to the upper extremity of the wellhead valve body 132 by a clamp 142 which maintains connection flanges 144 and 146 in intimate abutting sealed engagement. The upper extremity of the spool 140 is provided with a connector flange which is received by a collet connector 148 of the same general construction and operation as the collet connector illustrated in FIGS. 2 and 3. Production flow passages are provided in the the collet connector 148 for registry with the production flow passages of the spool and wellhead valve body which flow passages are communicated to conduits 150 threadedly received at the upper extremity of the collet connector 148. The collet connector 148 is provided with hydraulic actuation passages which are substantially identical in construction and function as compared with the passages 94 and 96 illustrated in FIG. 2. The hydraulic actuation passages are communicated to hydraulic fluid supply conduits 152 and 154 which receive pressurized hydraulic fluid from a supply source therefor. Hydraulic fluid supply passages for the various valve and valve operator assemblies of the wellhead, instead of extending through the collet connector is illustrated in FIGS. 2 and 3, are so constructed as to bypass the body portion of the collet connector. The shroud 156 of the collet connector 148 is provided with bosses 158 which provide support for a plurality of input modules 160 which are connected to the bosses by bolts 162. The hydraulic fluid supply conduits are received within internally threaded passages within the input module 160. A plurality of short nipples 164 are threadedly received within threaded apertures formed in the input modules 160 with the lower extremities thereof received in sliding sealed engagement with passages formed in a connection module 166 which is retained in assembly with bosses 168 on the spool 140 by a series of bolts 170. Sealing members, which may be of the O-ring type or any other acceptable conventional type, are carried at the lower extremity of the nipples 164 to establish sealed engagement with the fluid passages extending through the connection modules 166, thereby simultaneously disconnecting all of the hydraulic fluid supply conduits from the hydraulic fluid distribution conduits of the wellhead valve assembly. Connection from the hydraulic fluid supply systems to the hydraulic fluid distribution system of the wellhead valve and valve operator assembly, is achieved, therefore, through simple sliding sealed engagement of the nipple conduits 164 with the passages of the connection modules. A plurality of hydraulic fluid distribution conduits 172 extend from the connection module 166 to various input modules 174, being associated one with each of the valve and valve operator assemblies and serving to establish fluid communication with the hydraulic system of the valve and operator assembly to which it is connected. The input modules 174 also serve as mechanical guides and supports for conduits extending to other valves and operators of the wellhead valve assembly. As illustrated schematically in FIG. 5, each of the hydraulic fluid supply conduits will be controlled by valves 178 for selective communication of pressurized hydraulic fluid from a hydraulic fluid supply source S to selector ones of the valve and valve operator assemblies of the wellhead. Fluid communication is established between all of the hydraulic fluid supply conduits and the hydraulic fluid distribution conduits of the wellhead valve system simultaneously as the collet connector 148 is moved into assembly with the upper portion of the spool 140 in the manner described above. Simultaneous connection and disconnection of the production flow passages and the hydraulic fluid supply passages of the wellhead valve system is thereby readily accomplished merely by simple locking or unlocking movement of the collet connector 148.

In the event of failure of power for the hydraulic fluid supply source S or in the event the hydraulic fluid supply source S becomes inoperative due to damage, the collet connector 44 illustrated in FIGS. 2 and 3, and the collet connector 148 illustrated in FIG. 5, may be manually disconnected simply by connecting lifting apparatus to lifting ears 180 and raising the shroud member relative to the collet body to cause unlocking movement of the segment clamps in the manner discussed hereinbelow. In order to raise the shroud member manually, it is necessary to bleed hydraulic fluid from the upper actuation chamber 84 which can be accomplished simply by opening a control valve in conduit 98 or by disconnecting conduit 98 from the hydraulic fluid supply system. As the shroud is raised, the internal flange 82 will decrease the volume within the hydraulic actuation chamber 84 forcing hydraulic fluid outward through the conduit 98.

It will be evident from the foregoing that I have provided a unique wellhead valve assembly construction and hydraulically actuated connecting device therefor, which effectively promotes quick assembly or disassembly of the production flow conduit structure and the hydraulic fluid supply conduit structure of the wellhead assembly. The ability to quickly remove the flow conduit and hydraulic supply conduit structure from the wellhead through utilization of this invention could prevent damage to the wellhead structure in the event the surface structure should be subjected to external damage or excessive strains caused by storms or the like. The unique hydraulic actuated collet connection structure set forth in this application, effectively adapts this structure for remote hydraulic actuation and precludes any necessity for sending a diver to the area of the connection during assembly or disassembly. In the event of hydraulic failure, I have shown that the collet connector of this invention can be mechanically operated to induce unlocking movement of the collet connector for removal of the same from the wellhead structure. I have further provided a quick assembly and disassembly structure for the wellhead system without materially altering the general structure of the wellhead. The feature allows utilization of wellheads of standard design during initial installation and promotes adaptability of the subsequent modification and adaptation without involving material alteration. The unique collet connector structure of my invention effectively allows the detection of leaking hydraulic fluid or production fluid in the event the joint between the collet connector and wellhead assembly fails to be properly sealed or in the even that subsequent wear of the seals causes the development of leakage. Any leakage is instantly signaled at a monitoring facility and steps for repair can be undertaken without delay. My wellhead valve system and unique collet connector structure effectively allows the development of a wellhead valve system which is simple in nature, reliable in use and low in cost. It is, therefore, seen that this invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the appended claims.

As many possible embodiments may be made of this invention without departing from the spirit or scope thereof, it is to be understood that all matters hereinabove set forth or as shown in the accompanying drawings are to be interpreted as illustrative and not in a limiting sense.

I claim:

1. A wellhead valve assembly comprising a wellhead body having a plurality of flow passages formed therein, valve and hydraulic valve operator assembly means carried by the wellhead body for controlling the flow of fluid through the flow passages, said wellhead body having a hydraulic fluid distribution system for supplying hydraulic fluid to selected ones of said hydraulic valve operator assemblies for operation of the same, said wellhead body having a connection flange defined at the upper extremity thereof, a connector body having a plurality of flow passages formed therein for registry with the flow passages of said wellhead body and having a plurality of hydraulic supply passages therein for registry with the hydraulic fluid distribution passages of said wellhead body, said connector body having a connection flange disposed in abutment with the connection flange of said wellhead body, shroud means surrounding said connection body and being disposed in movable relation therewith, said shroud means cooperating with said connection body to define an annular segment clamp retainer recess, a plurality of segment clamps being retained within said recess and being movable by said shroud for releasably clamping said connection flanges in assembly, means for imparting movement to said shroud, a plurality of flow conduits and hydraulic fluid conduits connected to said connector body in fluid communication with corresponding passages in said connector body.

2. A wellhead valve assembly as set forth in claim 1, said means for imparting movement to said shroud member comprising upper and lower hydraulic actuation chambers defined between said shroud member and said connector body, hydraulic fluid supply conduits communicated to said upper and lower hydraulic fluid chambers, said chambers being selectively pressurized and vented to cause reciprocation of said shroud member and unlocked positions thereof.

3. A wellhead valve assembly as set forth in claim 1, said shroud member when in locked assembly with said wellhead body establishing sealed engagement with said wellhead body and defining a leakage monitoring chamber about the joint between the wellhead body and the connector body, means for detecting leakage of fluid from the flow passages or hydraulic fluid passages.

4. A wellhead valve assembly as set forth in claim 3, said means for detecting leakage comprising fluid conduit means communicating said leakage detecting chamber with remotely located apparatus for signaling any leakage detected.

5. A wellhead valve assembly as set forth in claim 1, said shroud cooperating with said wellhead valve body and with said connector body to define a leakage detection chamber about said connection flanges, means detecting fluid pressure changes within said leakage detection chamber.

6. A wellhead valve assembly as set forth in claim 1, fluid passage means disposed in fluid communication with said leakage detection chamber, pressure responsive signal apparatus, said fluid passage means being in fluid communication with said pressure responsive signal apparatus whereby changes in fluid pressure within said leakage detection chamber will be monitored by said pressure responsive signal apparatus.

7. A conduit connector mechanism comprising conduit means having a first connection flange, connector body means having a second connection flange for abutting engagement with said first connector flange and having fluid passage means for registry with said conduit means, a plurality of segment clamps surrounding said connector body, a shroud surrounding said connector body and retaining said segment clamps in assembly with said connector body, said shroud being linearly movable from an unlatched position where said shroud unlatches said segment clamps from said first and second connection flanges to a latched position where said shroud cams said segment clamps into latching engagement with said first and second connection flanges binding said clamps into sealed assembly, said shroud engaging said conduit means below said first connection flange and establishing a seal therewith thereby defining a sealed leakage detection chamber surrounding said first and second connection flanges, a pressure detection passageway extending through said connector body means and terminating at said leakage detection chamber, a conduit being connected to said connector body in fluid communication with said pressure detection passageway, said conduit being disposed in fluid communication with means monitoring pressure conditions within said leakage detection chamber and giving a signal upon a change of pressure within said leakage detection chamber whereby a signal is given in the event the sealed connection between said conduit means and said connector body should leak.

8. A conduit connector mechanism as set forth in claim 7, said shroud means being movable relative to said connector body and cooperating with said connector body to define unlocking and locking hydraulic chambers, a source of hydraulic fluid, means selectively communicating hydraulic fluid under pressure from said source to said hydraulic chambers, whereby said shroud may be hydraulically actuated to selectively induce locking or unlocking movement to said segment clamps.

9. A conduit connector mechanism as set forth in claim 7, said means monitoring pressure conditions within said leakage detection chamber comprising pressure responsive signal apparatus, conduit means communicating said leakage connection chamber and said signal apparatus whereby any pressure change within said leakage detection chamber which would be caused by fluid leakage will be transmitted to said signal apparatus.

References Cited

UNITED STATES PATENTS

| 2,460,238 | 1/1949 | Penick | 285—93 X |
| 3,141,685 | 7/1964 | Watts | 285—93 |
| 3,166,345 | 1/1965 | Pinkard | 285—93 X |
| 3,239,248 | 3/1966 | Jones. | |

ERNEST R. PURSER, Primary Examiner

U.S. Cl. X.R.

166—89; 285—93, 145